United States Patent [19]

Kemp et al.

[11] 4,111,396
[45] Sep. 5, 1978

[54] FABRICATED GATE VALVE STRUCTURE

[75] Inventors: Willard E. Kemp; Bert L. Morrison, both of Houston, Tex.

[73] Assignee: ACF Industries, Incorporated, New York, N.Y.

[21] Appl. No.: 785,802

[22] Filed: Apr. 8, 1977

Related U.S. Application Data

[63] Continuation of Ser. No. 623,236, Oct. 17, 1975, abandoned.

[51] Int. Cl.² .............................................. F16K 3/02
[52] U.S. Cl. .................................... 251/328; 251/329; 251/367
[58] Field of Search ............... 251/315, 317, 327, 328, 251/329, 367, 172, 366

[56] References Cited

U.S. PATENT DOCUMENTS

| 773,642 | 11/1904 | Hayden et al. | 251/328 |
|---|---|---|---|
| 1,874,405 | 8/1932 | Wood | 251/328 |
| 2,201,895 | 5/1940 | Glen | 251/172 |
| 3,197,175 | 7/1965 | Siepmann | 251/329 |
| 3,207,471 | 9/1965 | Williams | 251/328 |
| 3,273,853 | 9/1966 | Pool et al. | 251/328 |
| 3,314,442 | 4/1967 | Volpin | 251/329 |
| 3,442,286 | 5/1969 | Anderson et al. | 251/329 |
| 3,580,541 | 5/1971 | Bouhot | 251/172 |
| 3,591,134 | 7/1971 | Fujiwara | 251/172 |
| 4,017,058 | 4/1977 | Morrison | 251/328 |

FOREIGN PATENT DOCUMENTS

| 1,005,913 | 10/1947 | France | 251/329 |
|---|---|---|---|
| 11,049 | 12/1953 | Fed. Rep. of Germany | 251/329 |

*Primary Examiner*—William R. Cline
*Assistant Examiner*—H. Jay Spiegel
*Attorney, Agent, or Firm*—Eugene N. Riddle

[57] ABSTRACT

A gate valve structure having a hollow body with inlet and outlet conduits mounted thereon and opposed seat support members mounted on inner ends of the conduits. The opposed seat support members have seat pockets which are finish machined before insertion into the hollow body. The opposed seat support members are in a predetermined spaced relation to each other and they are welded in such spaced relation to the hollow body from a position within the hollow body. One arrangement includes inlet and outlet conduit sections welded to the hollow body and opposed inner conduit sections having the opposed seat support members thereon with the inner conduit sections welded to the inlet and outlet conduit sections from a position inside the conduits to form a continuation of the outer conduit sections. Another arrangement includes inlet and outlet conduits having seat support members welded and finish machined prior to assembly. These conduits are positioned inside the hollow body with the seat support members in a spaced relation and welded inside the hollow body. Annular grooves in the seat support members adjacent the seat pockets aid in stress relieving. A gate is movably mounted between the seat support members.

A method of making a gate valve body includes fabricating and stress relieving a seat support assembly, then machining it to finished dimensions, then inserting the seat support assembly into a hollow body member. Next, the seat support assembly is welded inside the hollow body member. Local stress relieving of final welds in the body can be employed.

5 Claims, 24 Drawing Figures

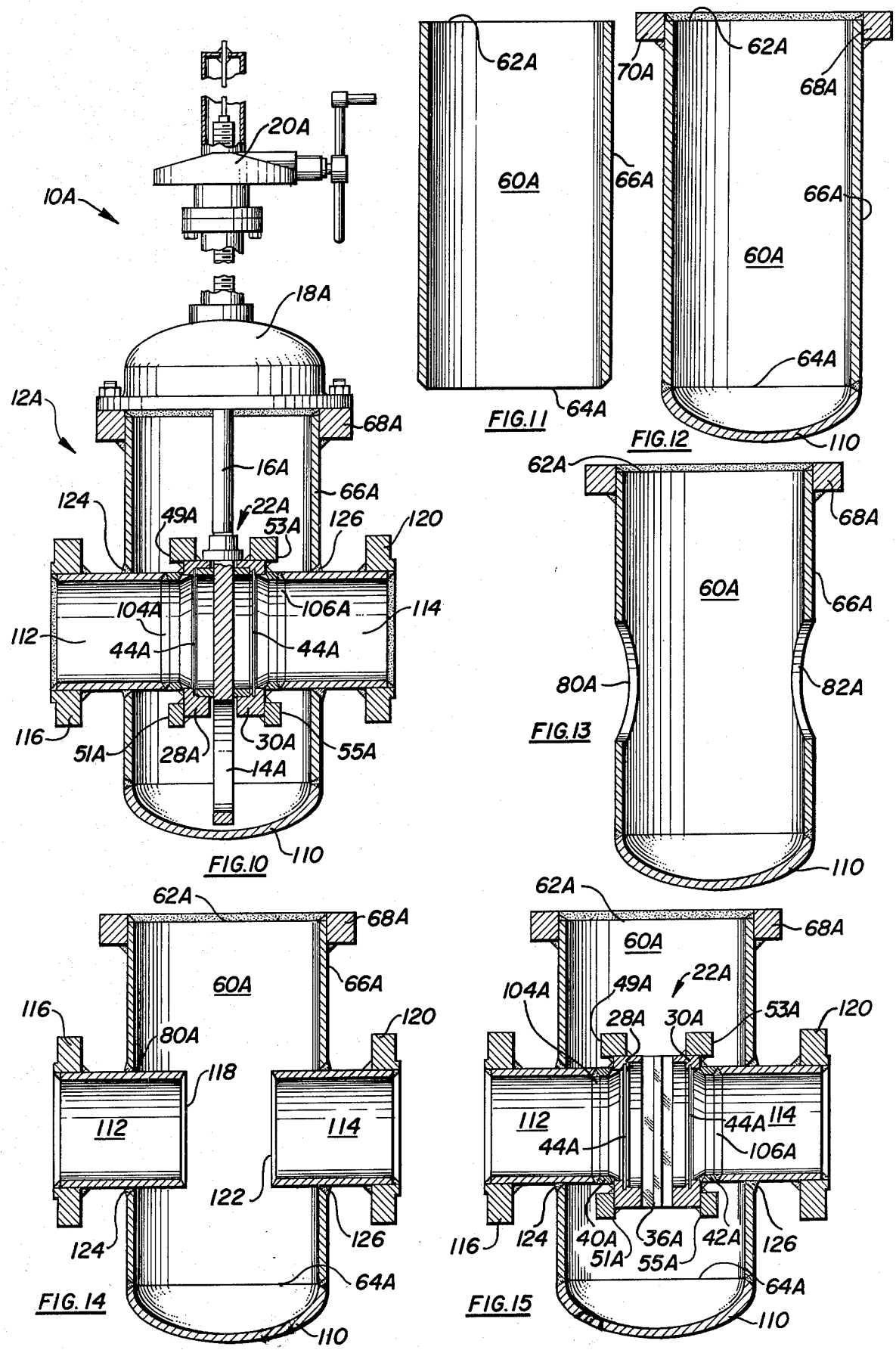

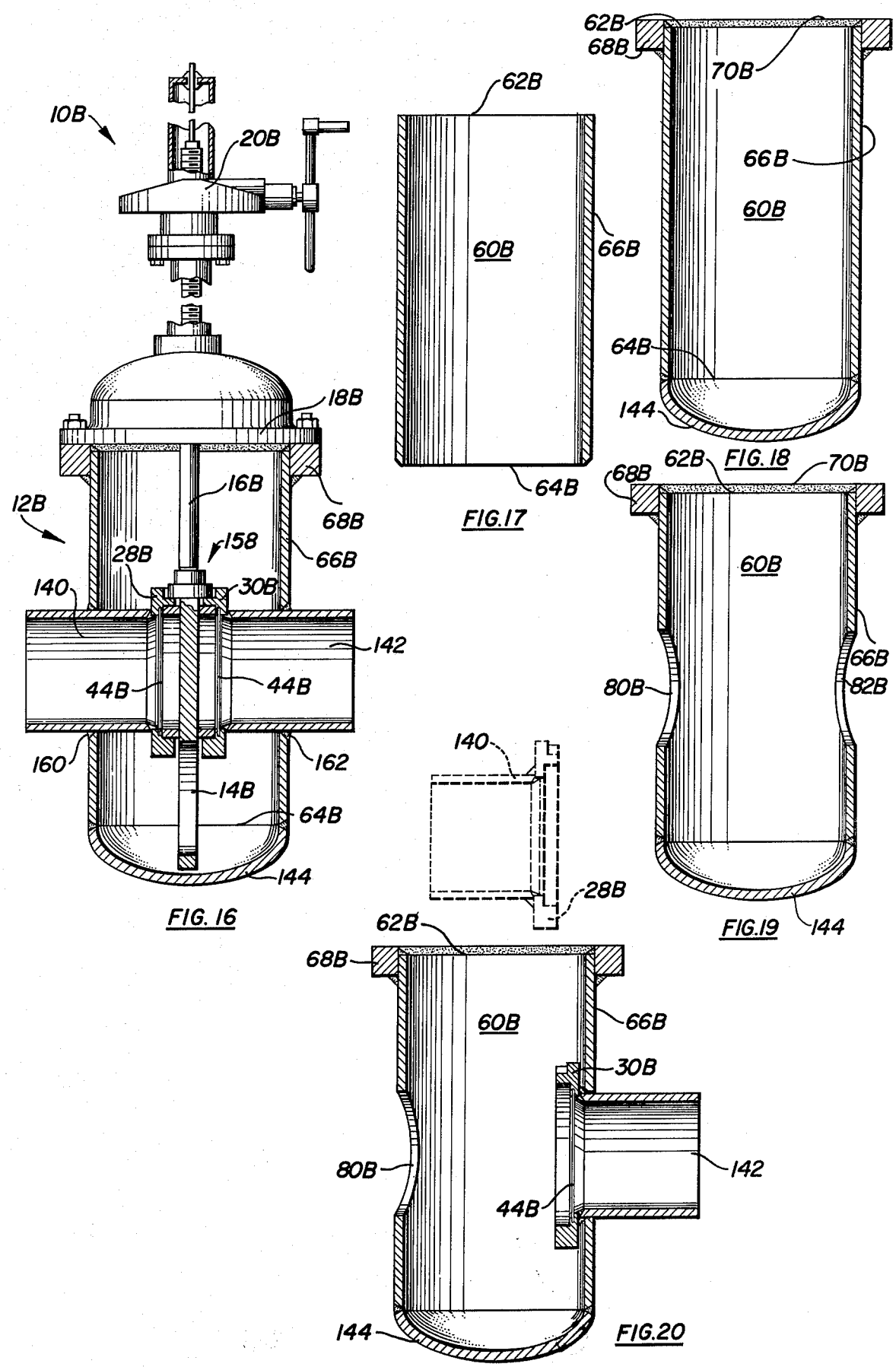

FABRICATED GATE VALVE STRUCTURE

This is a continuation of application Ser. No. 623,236, filed Oct. 17, 1975, now abandoned.

BACKGROUND OF THE INVENTION

This invention is related to fabricated gate valve body structures and methods of fabricating gate valve bodies. Prior art methods of fabricating gate valve bodies involve the welding of unmachined inlet and outlet conduits to a fabricated body structure, then machining the seat ring surfaces, flanges and other surfaces. In order to do the machining at this time very large equipment must be used to precisely and accurately machine the seat ring pockets and other surfaces on the gate valve body structure. This machining process is extremely costly because it is time consuming and it requires very expensive and delicate machinery to accurately produce the required surfaces. In the fabrication and welding of gate valve bodies, they are generally constructed with conduits being welded to sides of the structures from the exterior of the valve body itself. No prior art fabricated gate valve structure is known wherein welding is done on the interior of the structure once the conduits are placed in the structure.

Prior art gate valve structures which are fabricated are usually stress relieved after they have been welded and before they are machined in order to minimize warping and bending due to the welding process and to relieve residual stresses. These gate valve structures usually do not have any seat structure which will compensate for warpage and misalignment of the seat pocket zones which occur after the seat pockets are machined or while they are being machined.

SUMMARY OF THE INVENTION

In an embodiment a fabricated gate valve structure includes a valve body structure which has the body formed of a cross-sectionally round cylindrical member and a seat structure which is constructed to compensate for warping during fabrication of the valve.

In another embodiment a method of making a fabricated gate valve body structure includes fabricating a seat support assembly including a pair of seat support members and then finish machining of these members prior to welding them in place on a hollow body member. This feature of this invention is shown and described herein in three (3) specific embodiments of methods of fabrication of a gate valve body. Briefly, the method of manufacture of this invention includes fabricating and stress relieving a seat support assembly, then machining it to the finished dimensions, and then inserting the seat support assembly into a hollow body member and welding the seat support assembly inside the hollow body member.

One object of this invention is to provide a gate valve body structure and a method of making same which overcome the aforementioned disadvantages of the prior art gate valve structures and methods of manufacture.

Still, one other object of this invention is to provide a gate valve body structure having a seat support assembly which is constructed to compensate for warping and misalignment in the seat support members and which has a seat support assembly joined to inlet and outlet conduits of the hollow body by a weld joint formed on the interior of the conduits and the seat support assembly.

Still, the other object of this invention is to provide a method of making a fabricated gate valve body structure wherein a seat support assembly is fabricated, then finish machined, and then inserted into and welded inside a hollow body member thus eliminating the need for tedious machining after assembly of the valve body.

Yet, another object of this invention is to provide a fabricated gate valve body structure wherein a seat support assembly is constructed with conduits extending oppositely from the seat support members thereof and a groove is formed in the seat support members in a spaced relation to the bottom portion of each of the seat pockets and further wherein this assembly is welded in place inside a hollow body member.

Various other objects, advantages and features of this invention will become apparent to those skilled in the art from the following discussion, taken in conjunction with the accompanying drawings, in which:

DESCRIPTION OF THE DRAWINGS

FIG. 10 is a cutaway view of a complete fabricated gate valve structure having a rounded body bottom closure member and bonnet, and constructed in accordance with another embodiment, (2), of the method of manufacture of this invention;

FIG. 11 is a cross-sectional elevation view of a hollow body member for a second embodiment, (2), of the method of manufacture of this invention prior to welding on and cutting apertures in the hollow body member;

FIG. 12 is a cross-sectional view of a hollow body member for the valve structure shown in FIG. 11 with the rounded body bottom closure member and top flange welded in place;

FIG. 13 is a cross-sectional elevation of the hollow body member shown in FIG. 12 with opening cut in opposed sides of the hollow body members;

FIG. 14 is a cross-sectional elevation view of the hollow body member shown in FIG. 13 with conduit segments welded in place in the apertures;

FIG. 15 is a cross-sectional elevation view of the hollow body member shown in FIG. 14 with the seat support assembly welded in place between the conduit segments;

FIG. 16 is a cross-sectional elevation view of a completed fabricated gate valve and constructed by another embodiment, (3), of the method of manufacture of this invention;

FIG. 17 is a cross-sectional elevation view of a cylindrical hollow body member for a third, (3), embodiment of the method of manufacture of this invention prior to welding and cutting apertures in the hollow body member;

FIG. 18 is a cross-sectional view of a hollow body member shown in FIG. 17 with a rounded lower body closure member and a top flange welded in place thereon;

FIG. 19 is a cross-sectional elevation view of the hollow body member shown in FIG. 18 with openings cut in opposed sides thereof for mounting conduits of the seat support assembly;

FIG. 20 is a cross-sectional elevation view of the hollow body member shown in FIG. 19 with one end portion of the seat support assembly positioned through one opening and the other end portion of the seat support assembly shown in dashed lines positioned above the body prior to being inserted;

The following is a discussion and a description of the preferred specific embodiments of the fabricated gate valve structure and the method of making same of this invention, such being made with reference to the drawings, whereupon the same referenced numerals are used to indicate the same or similar parts and/or structure. It is to be understood that such discussion and description is not to unduly limit the scope of the invention.

DETAILED DESCRIPTION

Figure 1:
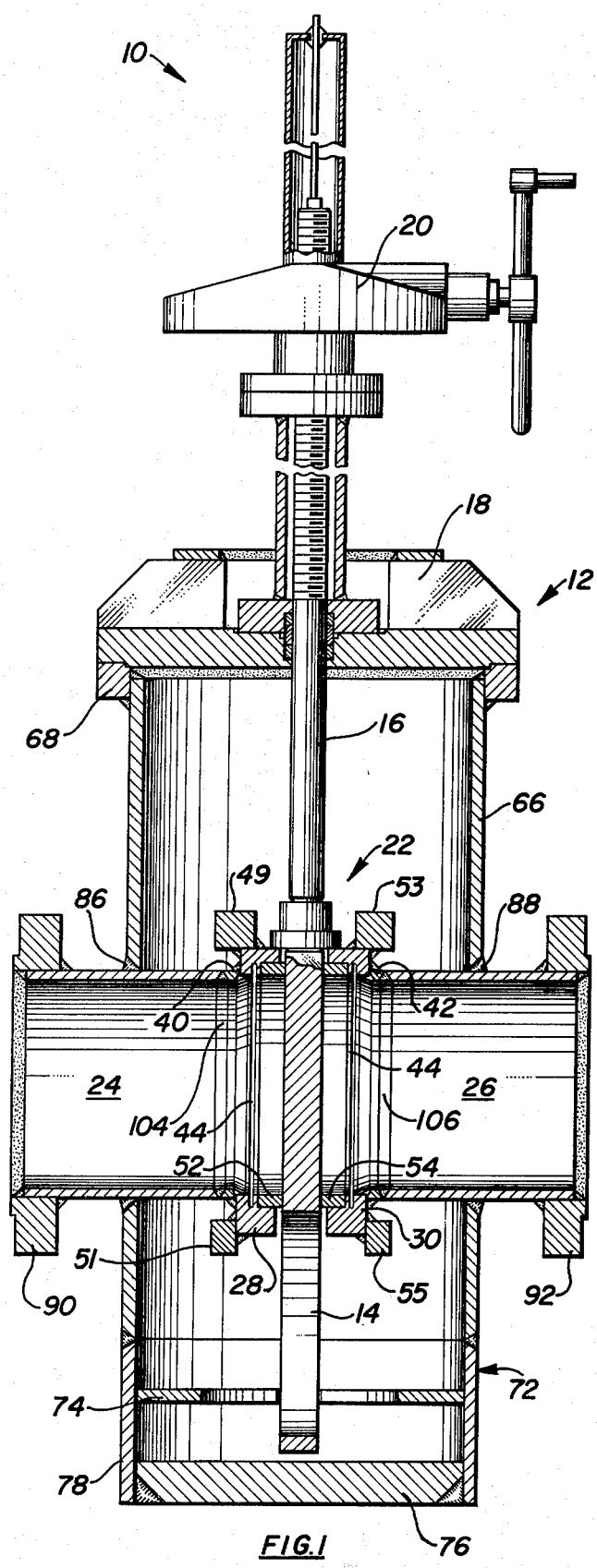
FIG. 1 is a cutaway elevation view of a completed fabricated valve produced by an embodiment (1), the method of manufacture of this invention and incorporating the structural details of this invention.

The structure of this invention is shown herein in two specific structural embodiments, one embodiment, (1), shown in FIGS. 1 and 10, and the other embodiment, (2), shown in FIG. 16. The method of manufacture of this invention is shown and disclosed herein in three procedural embodiments thereof. One procedural embodiment of the method of manufacture, (1), is illustrated in FIGS. 2–7, a second procedural embodiment of the method of manufacture, (2), is illustrated in FIGS. 11–15, and a third procedural embodiment of the method of manufacture, (3), is illustrated in FIGS. 17–24. The gate valve body produced by the first two procedural embodiments, (1) and (2), is shown in FIGS. 1 and 10 respectively. The gate valve body produced by the third procedural embodiment, (3), is shown completed in FIG. 16.

FIG. 1 shows in cross section a structural embodiment, (1), of the gate valve of this invention indicated generally at 10. Gate valve 10 includes a valve body indicated generally at 12, which encloses a gate 14 with a stem 16 attached thereto and extending through bonnet 18. An actuator 20 is mounted atop bonnet 18 and connected to stem 16. Valve body 12 includes a seat support assembly, indicated generally at 22, which is mounted with inlet and outlet conduits and receives and movably mounts a gate 14. Seat support assembly 22 is shown in detail in FIGS. 8 and 9. Seat support assembly 22 is constructed as a separate unit then, as described in the methods of manufacture hereinbelow, it is mounted with the remainder of the valve body structure. Seat support assembly 22 includes a pair of seat support members 28 and 30 having respective seat pockets 32 and 34 formed in the inner sides thereof. Seat support members 28 and 30 are joined together by side members 36 and 38 on opposite sides thereof. Side members 36 and 38 are plate-like spacer members secured to seat support members 28 and 30 by welding on the outer edge portions thereof as shown clearly in FIG. 9. Conduit segments 40 and 42 are joined to the outer ends of seat support members 28 and 30. Note the outer end portion of conduit segments 40 and 42 are beveled toward the interior of the conduits. This particular beveling is done so that when conduit segments 40 and 42 are joined with the inner ends of the inlet and outlet conduits 24 and 36, the parts can be welded from the interior of the conduits.

Figure 9:
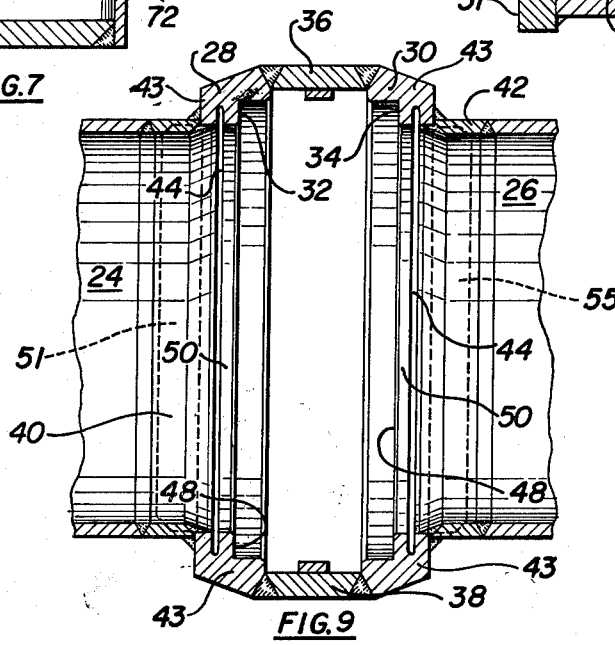
FIG. 9 is a cross-sectional view of the seat support assembly and adjoining conduits, with the view taken on a plane parallel to the elongated axis of the conduit and perpendicular to the elongated axis of the hollow body member.

An important feature of the seat support assembly 22 is in the structure of the seat support members in the area of the seat pockets 32 and 34. The interior of each seat support member 28 and 30 is constructed similarly. Each seat support member is constructed with an outer structural mounting cantilever beam portion 43 and an inner seat supporting cantilever beam portion 50. Referring to FIG. 9, outer structural cantilever beam 43 is formed by the outer portion of seat support members 28 and 30 and conduit segments 40 and 42 respectively. By regarding side members 36 and 38 as essentially rigid, the outer portion of the seat support members can be considered as a cantilever beam where the load is applied at the weld joint on the outer ends of conduit segments 40 and 42. In other words, outer cantilever beam portion 43 is a non-rigid portion of the seat support members which is connected to the conduits. This non-rigid portion of the structure can be considered as functioning like a cantilever beam thus it is referred to as a cantilever beam portion. Deflection of outer cantilever beam 43 is caused by shrinkage in welding conduit segments 40 and 42 to inlet and outlet conduits of valve body 12. Inner cantilever beam portion 50 forms an annular seat supporting lip and extends inwardly from outer cantilever beam portion 43 as shown. Inner and outer cantilever beam portions 43 and 50 are separated by a radially disposed inwardly opening groove 44. Groove 44 can be about essentially as deep as the radially disposed portion of the seat pockets in each of the seat support members. Groove 44 can be placed a distance from seat pocket bottom surface 48 which is less than or essentially equal to the groove depth dimension. Functionally, inner cantilever beam 50 and groove 44 maintain the fixed position of the seat pockets while outer cantilever beam 43 compensates for deformation, distortion and bending of seat support assembly 22 such as is encountered when welding the seat support assembly in place. When the welding takes place outer cantilever beam portion 43 deflects and this allows inner cantilever beam portion 50 and the seat pockets to remain essentially in a fixed position in seat support assembly 22. Outer cantilever beam portion 43 also deflects when bending forces are applied to the inlet and outlet conduits of valve 12 so inner cantilever beam portion 50 can maintain the fixed seat positions. With a seat ring positioned in the seat pockets, a spring or some resilient portion of the seat ring rests on the pocket bottom surface 48 and it is in effect supported on the inner cantilever beam 50. When seat support assembly 22 is welded into position inside valve body 12, the inlet conduit 24 and outlet conduit 26 are welded to conduit segments 40 and 42 at weld joints placed from the interior of the conduits. In this welding process shrinkage occurs at the weld joints, and because of this seat support assembly 22 is subjected to tension forces. These tension forces will tend to deform seat support members 28 and 30 by pulling outer cantilever beam portion 43. The overall result of these welding induced forces is that the seat pocket portion of seat support assembly 22 is deformed; however, groove 44 and outer cantilever beam 50 deflects thereby isolating the valve seats from deformation. FIG. 1 shows seat support assembly 22 with valve seats 52 and 54 positioned in pockets in the seat support members 28 and 30, respectively. The normal position of valve seats 52 and 54 in the seat pockets is with one end of the seats resting on or in contact with seat pocket bottom surface 48 so they are each supported by an inner cantilever beam 50.

Figure 8:
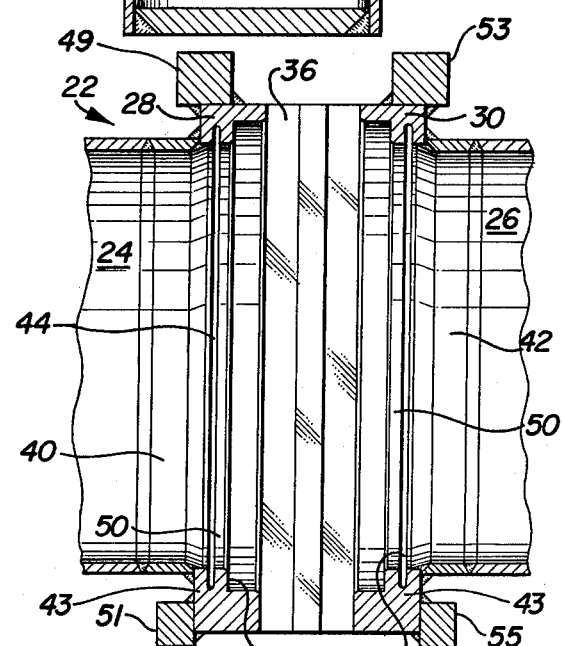
FIG. 8 is a cross-sectional view of the seat support assembly and adjoining conduits, with the view taken on a plane oriented parallel to the elongated axis of both the conduit and the hollow body member.

Another important feature of seat support assembly 22 is the ribbed construction of the seat support members. As shown in FIG. 8 wherein seat support members 28 and 30 each have horizontally positioned ribs on their upper and lower edge portions for stiffening. Seat support member 28 has an upper rib 49 and a lower rib 51 welded thereto as shown. Seat support member 30 has an upper rib 53 and a lower rib 55 welded thereto as shown. The ribs extend across the horizontal span of the seat support members but terminate short of the ends of the members thus they are not visible directly in FIG. 9.

These ribs 49, 51, 53 and 55 stiffen the seat support members 28 and 30 for resisting the welding induced forces which tend to pull the seat support members 28 and 30 apart. The ribs can be welded to the seat support members as shown or they can be integrally formed if desired. In placing the ribs they can be placed on top of the seat support members as ribs 49 and 53 are shown or they can be placed on the outer sides as ribs 51 and 55 are shown depending upon specific structural requirements of a valve.

It is to be noted that the ribs and inner cantilever beam 50 both provide structural compensation for welding induced forces on the seat pockets. Although both the ribs and the inner cantilever beam 50 are shown it is to be understood that either alone may be used if desired or they may be used together if desired. Obviously, the choice of whether ribs or inner cantilever beam 50 or both are to be used will depend upon specific structural details of a valve body and components to be used therewith.

The second structural embodiment, (2), of the gate valve of this invention is shown in FIG. 16 and described in detail in the following at the point preceding a discussion of the method of making that embodiment.

An embodiment, (1), of the method of manufacturing a fabricated gate valve body of this invention is illustrated in FIGS. 2–7 with FIG. 1 showing the completed and assembled valve structure. A preliminary step in the method of manufacture of this invention is to fabricate seat support assembly 22 for mounting later. Fabrication of seat support assembly 22 includes assembling and welding together seat support members 28 and 30, side plates 36 and 38 are conduit segments 40 and 42. Once seat support assembly 22 is welded together it is stress relieved by placing it in an oven for a predetermined time, then cooling. The length of time seat support assembly 22 is heated depends upon its thickest members. Generally heating at about 1100° to about 1200° F. for one hour for each inch of thickness is satisfactory. After stress relieving the seat ring pocket surfaces, all machined surfaces and any other specially shaped surfaces are shaped and machined to finish or final dimensions.

Figure 2:
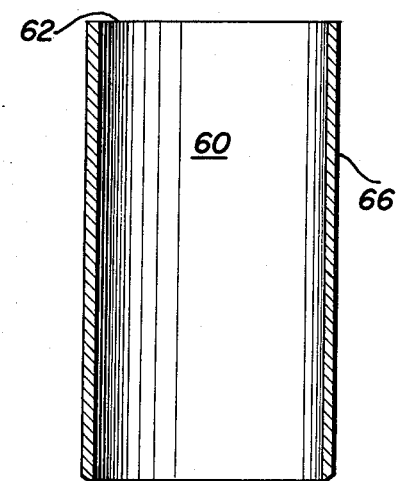
FIG. 2 is a cross-sectional elevation view of a hollow body member for an embodiment, (1), of the method of manufacture prior to cutting apertures in the hollow body member.

The first step in this embodiment, (1), of the method of manufacturing of this invention is illustrated in FIG. 2 wherein a right cylindrical segment of cross-sectionally round conduit is shown. This conduit is referred to hereinafter as a hollow body member 60. The ends 62 and 64 of hollow body member 60 are preferably cut essentially perpendicular to the side wall 66. Ends 62 and 64 are hereinafter referred to as the upper end and the lower end, respectively.

Figure 3:
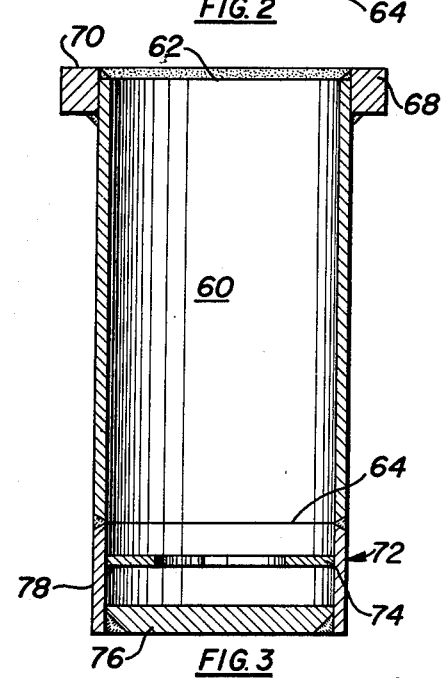
FIG. 3 is a cross-sectional elevation view of the hollow body member shown in FIG. 2 having a body bottom closure member welded in place and a top flanged member welded in place.

FIG. 3 shows the next step in this embodiment, (1), of the method of manufacture of this invention. In this step, a top flange 68 is welded to hollow body member upper end 62. Top flange member 68 is fully machined on its perimeter, its upper surface 70, and including all boring, drilling, tapping, etc., prior to being welded to side wall 66. Additionally, a body bottom closure member 72 is welded to hollow body member bottom end 64. Bottom closure member 72 is shown here in a fabricated form constructed from a ring 74 and an end plate 76 enclosed in and welded to a sleeve member 78. It is to be noted that any machining required on body bottom closure member 72 is done prior to welding it to side wall 66. The weld joint between lower end 64 and bottom closure member 72 is beveled so the welding can be completed from the exterior of the hollow body member.

Figure 4:
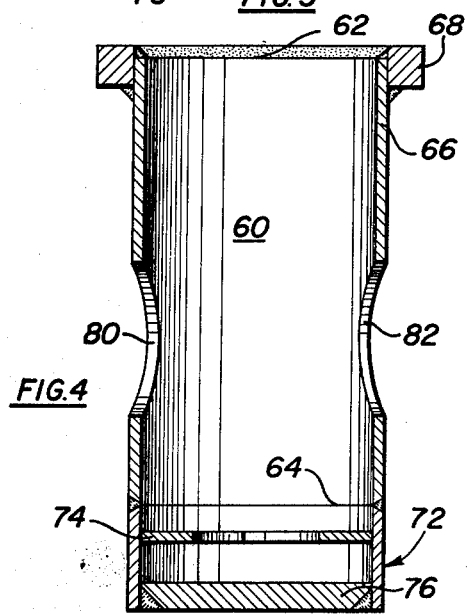
FIG. 4 is a cross-sectional elevation view of the hollow body member shown in FIG. 3 having openings cut in opposed sides thereof.

FIG. 4 illustrates the next step in this embodiment, (1), of the method of manufacture of this invention. In this step, openings or apertures 80 and 82 are cut through hollow body member side wall 66. Apertures 80 and 82 are positioned on opposed sides of the hollow body member through a mid-portion of the length of the structure, as illustrated. Apertures 80 and 82 are essentially the same size. Edges of the apertures are beveled toward the exterior of hollow body member 60.

Figure 5:
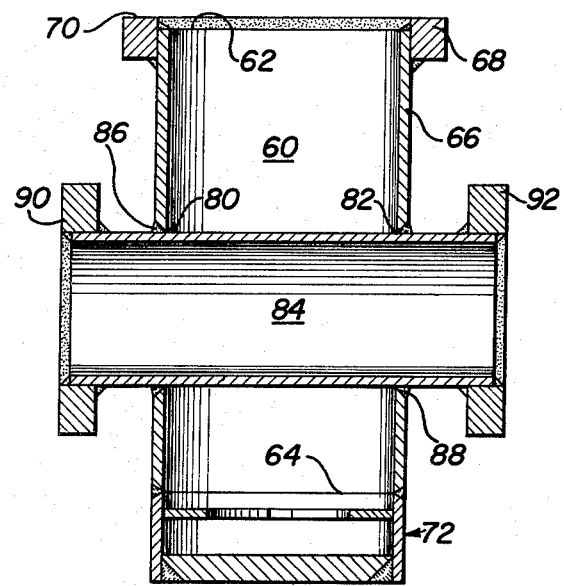
FIG. 5 is a cross-sectional elevation view of the hollow body member shown in FIG. 4 having a conduit extending through the openings and welded in place.

FIG. 5 illustrates the next step in this embodiment, (1), of the method of manufacture of this invention. In this step a conduit segment 84 is positioned through openings or apertures 80 and 82 and extends from opposite sides of hollow body member 60. Then when conduit segment 84 is positioned as desired it is welded to hollow body member side wall 66 on the exterior thereof at joints 86 and 88. Conduit 84 can have flanges 90 and 92 welded on opposite ends thereof as shown if desired. If flanges are desired they can be welded in place on conduit segment 84 after it is positioned through hollow body 60 or after it is welded to hollow body member 60.

The next step in this embodiment, (1), of the method of manufacturing a fabricated gate valve of this invention involves stress relieving of the gate valve body structure as completed so far. In this step the partially completed gate valve body structure is enclosed in an oven and heated for a predetermined time at a predetermined temperature then cooled to the room temperature. This stress relieving procedure relieves stresses on hollow body member 60 and conduit segment 84 so that warping and residual stresses are minimized. In practice it has been found acceptable to heat a valve body structure to approximately around 1100° to 1200° F for a period of about one hour for each inch of thickness of the thickest part.

Figure 6:
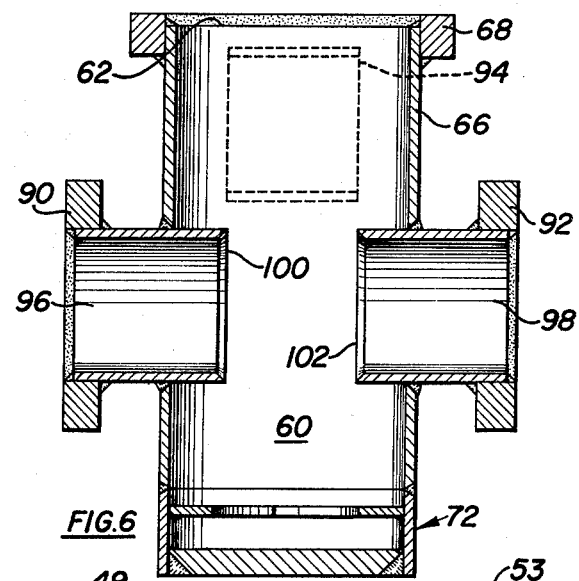
FIG. 6 is a cross-sectional elevation view of the hollow body member shown in FIG. 5 with a center portion of the conduit removed and shown in dashed lines and the remaining conduit segments having the inner end portions thereof beveled toward the interior of the conduits.

FIG. 6 illustrates the next step in this embodiment, (1), of the method of manufacturing a fabricated gate valve of this invention. In this step conduit segment 84 is cut and a center portion 94 is removed as shown in dashed lines thereby forming a pair of conduit segments 96 and 98 from conduit segment 84. Conduit segments 96 and 98 extend into a mid or center portion of the cavity of hollow body member 60 with the inner ends thereof 100 and 102 respectively being essentially planar and oriented parallel to the longitudinal axis of hollow body member 60. After the conduit is cut the conduit segment ends 100 and 102 are beveled toward the interior of the respective conduit segments. Where hollow body member 60 is cross-sectionally round then conduit segment ends 100 and 102 preferably terminate in an equal distant relation from the elongated axis of hollow body member 60.

Figure 7:
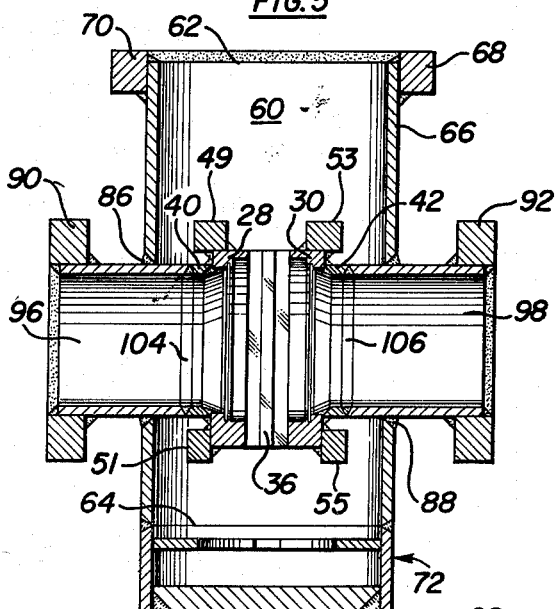
FIG. 7 is a cross-sectional elevation of the hollow body member shown in FIG. 6 with the seat support assembly welded in place.

FIG. 7 illustrates the next step in this embodiment, (1), of the method of manufacturing a fabricated gate valve of this invention. In this step, seat support assembly 22 (described above) is positioned inside the cavity of hollow body member 60 and it is welded to the inner ends 100 and 102 of conduit segments 96 and 98 respectively. In this step seat support assembly 22 is positioned with an open portion thereof oriented toward body member upper end 62 and top flange 68 and conduit segments 40 and 42 are aligned with conduit segments 96 and 98. Welding seat support assembly conduit segments 40 and 42 to conduit segments 96 and 98 forms a pair of circular weld joints 104 and 106. Weld joints 104 and 106 are formed on the interior of the conduits as shown. In weld joints 104 and 106 filler metal is introduced into the beveled end portions of the conduit segment ends. During the actual welding a temporary shield (not shown) can be positioned over a critical portion of the seat support assembly 22 to prevent damaging critical portions of the previously machined structure. At this point it is noted that the novel cantilever beam and grooved structure in seat support assembly 22 minimizes deformation of seat pockets as the weld joint is formed and as it cools.

At this point, an additional stress relieving step can be employed if desired. This step may or may not be necessary or desirable, depending upon the specific design of a valve including sizing, tolerances and choice of materials. In this step conduit segments 24, 40, 42 and 26, including internal weld joints 104 and 106, are stress relieved locally in the valve body structure. This stress relieving distributes loads created by previously welding induced forces. The zones of stress relieving extend from seat support members 28 and 30 outward along the conduits.

This stress relieving can include weld joints 86 and 88 and portions of hollow body 66 adjacent thereto. The specific time and temperature for this stress relieving step obviously depends upon thicknesses of the members involved.

At this point, the fabricated valve body 12 is complete and once it is cooled, inspected, tested, etc., the complete valve can be assembled to the configuration shown in FIG. 1.

In the following description, similar parts and/or structure of the gate valve which are similar to parts and/or structure described above have similar numerals followed by a letter "A" or "B" for clarity. The letter "A" relates the items to the second method embodiment, (2), and the letter "B" relates the items to the third method embodiment, (3).

Another embodiment, (2), of the method of fabricating a gate valve body structure of this invention is illustrated in FIGS. 10–15 with FIG. 10 showing the completed and assembled valve structure 10A. A preliminary step in carrying out the method of manufacture of this embodiment, (2), is to fabricate seat support assembly 22A for mounting with the remainder of the structure later. Fabrication of seat support assembly 22A includes the assembling and welding together of seat support members 28A and 30A, sides 36A and 38A, and conduit segments 40A and 43A as shown in FIGS. 8 and 9 where the assembled structure is depicted in cross section. Once seat support assembly 22A is welded together it is stress relieved by placing in an oven for a predetermined time then cooling. The length of time this unit is heated depends upon its thickest member as discussed above. Next, the seat ring pocket surfaces and all machined surfaces as well as any other shaped surfaces on seat support assembly 22A are finished to final dimensions.

FIG. 11 shows the initial step in this embodiment, (2), of the method of manufacture of the fabricated gate valve body of this invention. In FIG. 11, a right cylindrical segment of a cross-sectionally round conduit is shown. This conduit is referred to hereinafter as a hollow body member 60A. The ends 62A and 64A of hollow body member 60A are preferably cut essentially perpendicular to side wall 66A. Ends of 62A and 64A are hereinafter referred to as the upper end and the lower end respectively.

FIG. 12 shows the next step in this embodiment, (2), of the method of manufacture of a fabricated gate valve of this invention. In this step a top flange 68A is welded to upper hollow body member end 62A. Top flange member 68A is fully machined on its perimeter and its upper surface 70A, and including all boring, drilling, tapping, etc., prior to being welded to side wall 66A. Additionally, a bottom closure member 110 is welded to hollow body bottom member 64A. Body bottom closure member 110 is shown as a dish-like member with a partially spherically shaped center portion and inwardly curved edged portions which are joined with side wall 66A. It is to be noted that any machining required on bottom closure member 110 is done prior to welding it to side wall 66A. The weld joint between lower end 64A and bottom closure member 110 is beveled so the welding can be completed from the exterior of the hollow body member. It is to be noted that bottom closure member 110 differs structurally from bottom closure member 72 shown in FIGS. 1–7. Functionally, the structural differences are of no significance from a manufacturing standpoint, depending upon the capabilities of a particular manufacturer and the availability of the bowl-like members.

FIG. 13 illustrates the next step in this embodiment, (2), of the method of manufacture of this invention. In this step, openings or apertures 80A and 82A are cut through hollow body member side wall 66A. Apertures 80A and 82A are positioned in a transverse relation on the opposite sides of the hollow body member through the midportion of the length thereof, as illustrated. Apertures 80A and 82A are essentially the same size. Edges of the openings or apertures are beveled toward the exterior of hollow body members 60A so later conduits can be welded to the valve body from the exterior.

FIG. 14 illustrates the next step in this embodiment, (2), of the method of manufacture of this invention. In this step, the inlet and outlet conduit segments 112 and 114 are positioned through apertures 80A and 82A repsectively and then the conduit segments are welded to side wall 66A. Conduit segment 112 is constructed with a flange 116 on the end portion thereof which is external to hollow body member 60A and its opposite inner end 118 is planar with the inside of the conduit being beveled toward the interior of the conduit. Conduit segment 114 has a flange 120 on the end thereof which is exterior to hollow body member 60A and its opposite inner end 122 is planar with the inside thereof beveled toward the interior of the conduit. Conduit segment ends 118 and 122 extend into a mid or center portion of the cavity of hollow body member 60A with the inner ends thereof 118 and 122 respectively being essentially planar and oriented parallel to the longitudinal axis of hollow body member 60A. Preferably a jig or mounting fixture (not shown) is used to mount and support conduit segments 112 and 114 in a rigid position with inner ends of the conduits being held in a parallel spaced relation while they are welded to side wall 66A and during the stress relieving step which follows. Conduit segment 113 is welded to side wall 66A at a weld joint 124 around the perimeter of the conduit at its juncture with side wall 66A. Likewise, conduit segment 114 is welded to side wall 66A at a weld joint 126 at the juncture of the conduit section and the side wall. Where hollow body member 60A is cross-sectionally round, then conduit segment ends 118 and 122 preferably terminate in an equi-distant relation from the elongated axis of hollow body member 60A.

The next step in this embodiment, (2), of the method of manufacturing a fabricated gate valve of this invention involves stress relieving of the gate valve body structure in its partially completed condition. In this step the partially completed gate valve body structure as described in the preceding paragraph is enclosed in an oven and heated for a predetermined time at a predetermined temperature then cooled to room temperature. The stress relieving procedure functions to relieve stresses on hollow body member 60A and conduit segments 112 and 114 and in other portions of the structure so that warping and residual stresses in the structure are minimized or significantly reduced. In practice it is expected that for common materials used in pipeline grade valves it will be acceptable to heat the valve body structure to between about 1100° to 1200° F. for a period of about one hour for each inch of thickness of the thickest part. Preferably during the heating and cooling in this stress relieving step the jig or mounting fixture used for positioning conduit segments 112 and 114 remains in position on the members of the structure so conduit segment ends 118 and 122 remain essentially in their aligned and spaced relation.

FIG. 15 illustrates the next step in this embodiment, (2), of the method of manufacturing a fabricated gate valve of this invention. In this step, seat support assembly 22A in its complete finish machined condition described above, is positioned inside the cavity of hollow body member 60A and it is welded to the inner ends 118 and 122 of conduit segments 112 and 114 respectively. In this step, seat support assembly 22A is positioned with an open portion thereof oriented toward body member upper end 62A and top flange 68A and conduit segments 40A and 42A are aligned with conduit segments 112 and 114 respectively. Welding seat support assembly conduit segments 40A and 42A to conduit segments 112 and 114 is accomplished by forming a pair of circular weld joints 104A and 106A between the inwardly beveled ends on the interior of the conduits as shown. In weld joints 104A and 106A filler metal is introduced into the beveled portions of the conduit segment ends from inside the conduits. During the actual welding a temporary shield can be positioned over finish machined portions of seat support assembly 22A to prevent damage. At this point it is to be noted that the novel cantilever beam and grooved structure 43 in seat support assembly 22A minimizes deformation of the seat pockets as weld joints 104A and 106A are formed and as the heated welded structure cools. The novel features of the seat support assembly are described above in the discussion of the first method embodiment, (1).

At this point in the fabrication process an additional stress relieving step can be included if desired. This step may or may not be necessary or desirable depending upon the specific design of a particular valve, including consideration of sizing, tolerances and choice of materials. In this step conduit segments 112, 40A, 42A and 114 are stress relieved locally. Stress relieving here distributes loads that were created by previously welding seat support assembly 22A to conduits 112 and 114. The zones which are stress relieved extend outward from seat support members 28A and 30A along the conduits and can include weld joints 124 and 126 and portions of hollow body 66A adjacent thereto. The specific time and temperature requirements for this stress relieving step obviously depend upon thicknesses of the members involved.

At this point the fabricated valve body 12A is completed. After valve body 12A has cooled, been inspected, tested, etc., the complete valve can be assembled to the configuration shown in FIG. 10.

FIG. 16 shows in cross section a second structural embodiment, (2), of the fabricated gate valve of this invention with such being indicated generally at 10B. Gate valve 10B includes a valve body, indicated generally at 12B, which encloses a gate 14B with a stem 16B attached thereto and extending through bonnet 18B. An actuator 20B is mounted atop bonnet 18B and connected to stem 16B. Valve body 12B includes a seat support assembly, indicated generally at 158 which is on the inner end portions of inlet and outlet conduits 140 and 142 respectively. Seat support assembly 158 receives and mounts gate 14B. Seat support assembly 158 consists of seat support members 28B and 30B mounted on the inner ends of conduits 140 and 142. Seat support members 28B and 30B are similar to that shown in detail in FIGS. 8 and 9 and as described hereinabove including the novel cantilever beam structure. In this embodiment, (2), seat support assembly 158 has seat support members 28B and 30B attached to conduit segments 140 and 142 which are assembled and welded inside valve body 12B.

Figure 24:
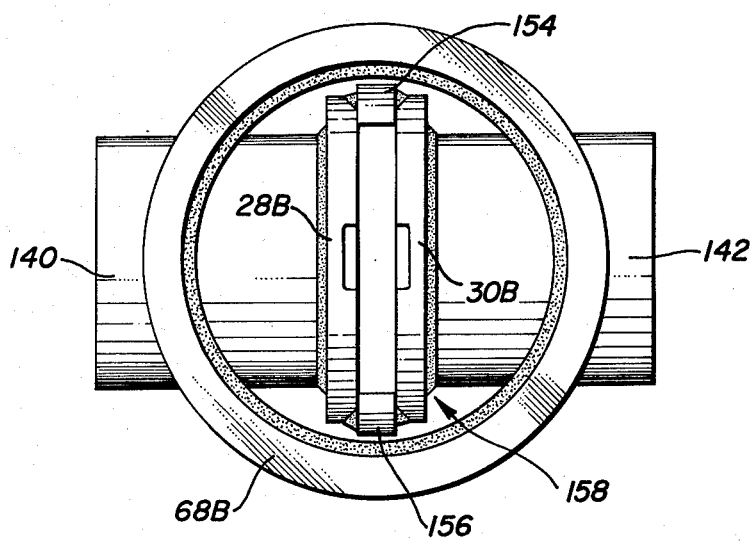
FIG. 24 is a top plan view of the fabricated gate valve body shown in FIG. 22 with both seat support assembly sides welded in place on the seat support assembly, and the seat support assembly being welded in place.

Seat support assembly 158 in this structural embodiment, (2), is essentially the same as the first described seat support assembly 22 and includes the important features of the outer cantilever beam 43B, the groove 44B, and the inner cantilever beam in each of the seat support members. In this structure the cantilever beams serve the same purpose as described above, namely to allow seat support assembly 158 to compensate for and distribute the welding induced forces and other forces on it. In seat support assembly 158 the seat support members 28B and 30B are secured together by seat support assembly side members 154 and 156 and they are directly attached to the inlet and outlet conduits as shown in FIG. 24. For brevity, the detailed description of the seat support members is not repeated here as it would be a duplication of that set forth above with the first described structural embodiment, (1), of this invention.

Another embodiment, (3), of the method of manufacturing a fabricated gate valve body of this invention is illustrated in FIGS. 17-24 with FIG. 16 showing the completed and assembled gate valve structure 10B. A preliminary step in this method, (3), of manufacture is to fabricate the conduit segments and seat support members for assembly later. Conduit segments 140 and 142 are constructed with seat support members 28B and 30B respectively mounted thereon. Seat support rings 28B and 30B are roughly O-shaped and then welded to conduit segments 140 and 142. After welding these conduit segments are stress relieved by heating in an oven for a predetermined time. The time and temperature for this stress relieving is done in accordance with guidelines set out above. After stress relieving of these segments seat support rings 28B and 30B are completely finish machined. Generally speaking, conduit segments 140 and 142 are constructed as similar but separate units and all machine surfaces as well as any other special shaped surfaces thereon are finished to final dimensions when the units are complete. Only after the units are complete are they placed in and welded to the valve body.

The first step in this embodiment, (3), of the method of manufacture of this invention is illustrated in FIG. 17 wherein a right cylindrical segment of cross-sectionally round conduit is shown. This conduit is referred to hereinafter as a hollow body member 60B. The ends 62B and 64B of hollow body member 60B are preferably cut essentially perpendicular to side wall 66B. Ends 62B and 64B are hereinafter referred to as the upper end and the lower end respectively.

FIG. 18 shows the next step in this embodiment, (3), of the method of manufacture of this invention. In this step a top flange 68B is welded to hollow body member upper end 62B. Top flange member 68B is fully machined on its perimeter, its upper surface 70B and including all boring, drilling, tapping, etc., prior to being welded to side wall 66B. Additionally, a body bottom closure member 144 is welded to hollow body member bottom end 64B. Body bottom closure member 144 is shown as a bowl-shaped member having a substantially spherically shaped center portion with inwardly turned edge portions which are welded to side wall 66B at bottom end 64B. It is to be understood that the bottom closure member in this structure can differ from that shown without departing from the scope of the invention. The specific bottom closure member used on a particular valve structure is insignificant and as far as the method of manufacture of this invention is concerned. Bottom closure member 144 is beveled so that welding can be completed from the exterior of hollow body member 60B.

FIG. 19 illustrates the next step of this embodiment, (3), of the method of manufacture of this invention. In this step, openings or apertures 80B and 82B are cut through hollow body side walls 66B. Apertures 80B and 82B are positioned on opposite sides of the hollow body member through a mid-portion of the length thereof as illustrated. Apertures 80B and 82B are essentially the same size. Edges of the apertures are beveled toward the exterior of hollow body member 60B.

The next step in this embodiment, (3), of the method of manufacture of this invention involves stress relieving of the partially completed body as shown in FIG. 19. In this step the body as shown in FIG. 19 is placed in an oven and heated for a predetermined time at a predetermined temperature then cooled. Heating is done at the generally commonly accepted rate for steels of between about 1100° to 1200° F. for a period of about one hour for each inch of thickness of the thickest part thereof. This procedure relieves stresses in the body caused by welding on top flange 68B and bottom closure member 144, and any stresses resulting from cutting or burning openings 80B and 82B. It is significant to note that stress relieving the body at this stage obviates the need to stress relieve the entire body at a later time.

FIG. 20 illustrates the next step of this embodiment, (3), of the method of manufacture of this invention. In this step, conduit segment 142 is inserted into the cavity of hollow body member 60B with the conduit portion thereof oriented toward aperture or opening 82B. Conduit segment 142 is aligned with aperture 82B and inserted through aperture 82B to the position as shown in FIG. 20. Conduit segment 142 is positioned with the conduit side seat ring support member 30B contacting inner surface portions of side wall 66B.

Figure 21:
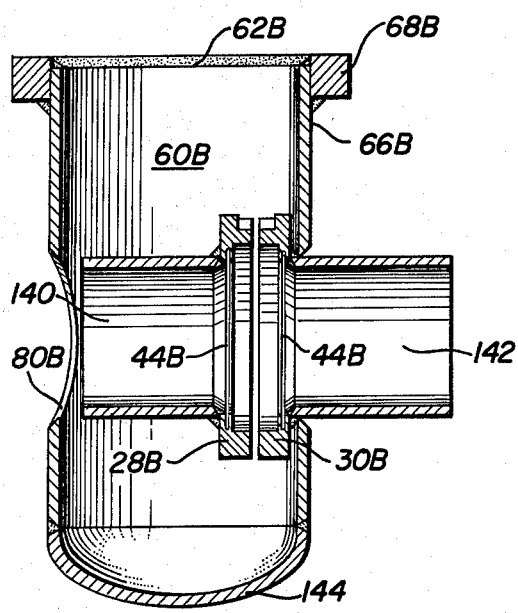
FIG. 21 is a cross-sectional elevation view of the hollow body member shown in FIG. 20 with the other end portion of the seat support assembly positioned inside the hollow body member cavity and adjacent to the other openings.

FIGS. 20 and 21 illustrate the next step in this embodiment, (3), of the method of manufacture of this invention. In this step, conduit 140 is positioned as shown in dashed lines in FIG. 20. Notice in this position the gate side of seat ring support member 28B is directed in opposing relation toward seat ring support member 30B. Next, conduit segment 140 is inserted into the cavity of hollow body member 60B to a position as shown in FIG. 21. Next, the conduit portion of conduit segment 140 is passed through aperture 80B to a point which places seat ring support member 28B in a mid-portion of the cavity of a hollow body member 60B.

Figure 22:
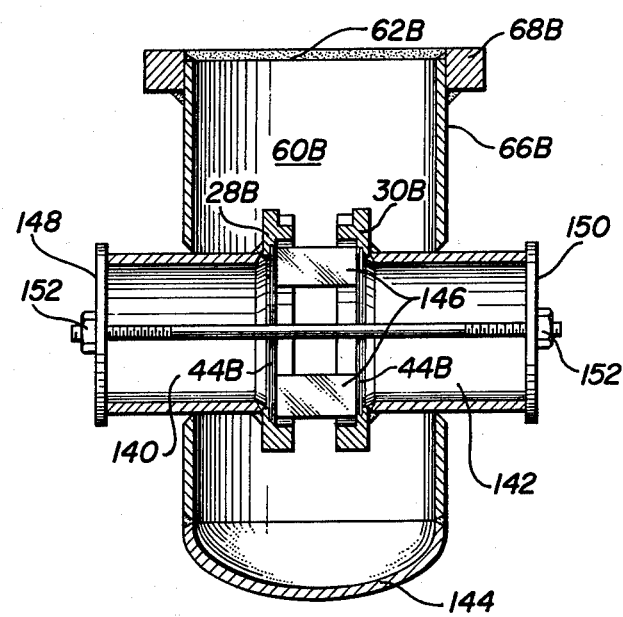
FIG. 22 is a cross-sectional elevation view of the hollow body member and seat support assembly shown in FIG. 21 with both end portions of the seat support assembly positioned through the openings and shown with a mounting fixture having spacing blocks positioned between the seat pockets, and a clamp assembly joining the outer end portions of the conduits.

FIG. 22 illustrates the next step in this embodiment, (3), of the method of manufacture of this invention. In this step, the conduit segments 140 and 142 are positioned with seat support members 28B and 30B in a spaced relation in a center portion of hollow body member 60B and a suitable mounting fixture or alignment jig is mounted with the conduit segments to position them in the desired space relation to each other and inside the cavity of the body member. Spacing blocks 146 are positioned between opposing surfaces on the seat support members 28B and 30B; conduit end plate support members 148 and 150 are positioned on opposed ends of conduit segments 140 and 142 respectively; and a bolt or suitable tightening structure 152 is connected between support members 148 and 150 to draw conduit segments 140 and 142 together thereby holding spacing blocks 146 in place and properly spacing the seat support members. The mounting fixture or jig shown is only one example of several physical jig constructions which can be used to support conduit segments 140 and 142 in a fixed position relative to each other for welding. Any suitable mounting fixture can be used.

Figure 23:
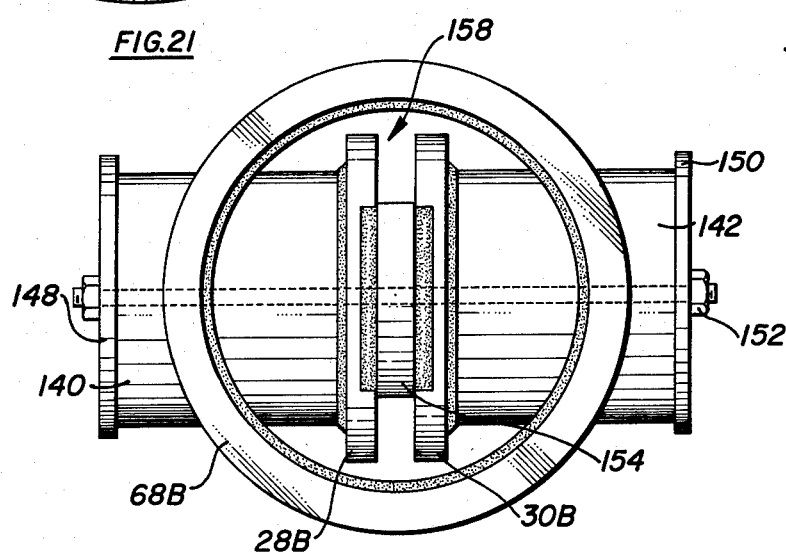
FIG. 23 is a top plan view of the fabricated gate valve body structure shown in FIG. 22 including the mounting fixture and showing a seat support assembly side welded in place on the visible side of seat support assembly.

FIG. 23 illustrates the next step in this embodiment, (3), of the method of manufacture of this invention. In this step, a seat support assembly side member is welded onto one side of the seat support members 28B and 30B. The conduit segments 140 and 142 are positioned so that the side portion of seat support members 28B and 30B which are to have a support plate mounted thereon are turned so that particular side portion of the structure is oriented toward the open end of hollow body member 60B or towards top flange 68B. A seat support assembly side member 154 is positioned on that particular side of seat support members 28B and 30B as illustrated, and then it is welded to the seat support members. During welding of the support plates to the seat support members the mounting fixture or jig is used to keep the members in place. After plate 154 is welded in place the conduit segments are rotated approximately 180° about their longitudinal axis so another similar side member 156 can be welded on the opposite side of seat support 28B and 30B. Support assembly side members 154 and 156 function as spacers to retain and hold seat support members 28B and 30B in the proper spaced relation in the permanent structure.

FIG. 24 illustrates the next step in this embodiment, (3), of the method of manufacture of this invention. In this step, the seat support assembly 158 and its connected conduit segments 140 and 142 are rotated approximately 90° about the longitudinal axis of the conduit segments from a position shown in FIG. 23 so that open spaces of seat support assembly 158 are approximately centered in hollow body member 60B. Next, conduit segments 140 and 142 are welded to side wall 66B at the juncture of the conduits and the side wall by weld joints formed from the exterior of the valve body structure. FIG. 16 shows weld joint 160 which connects side wall 66B and conduit segment 140 and weld joint 162 which connects side wall 66B and conduit segment 142.

At this point in this embodiment, (3), of the method of manufacturing of this invention, a stress relieving step can be included. This step may or may not be necessary depending upon the specific design of a particular valve. In this step, the inlet and outlet conduit segments are heated for a predetermined time at a predetermined temperature and cooled to room temperature. During heating and cooling the mounting fixture can be left in place. This procedure relieves stresses in weld joints 160 and 162, and in conduit segments 140 and 142 so that warping and residual stresses from the welding are minimized. It is expected that for pipeline grade valves that in practice it will be acceptable to heat the specific members to approximately around 1100° to 1200° F for a period of around one hour for each inch of thickness of the thickest part.

At this point fabricated valve body 12B is complete and once it has cooled, been inspected, tested and etc., the complete valve can be assembled in the configuration as shown in FIG. 16.

In following the method of manufacturing of this invention it is obvious that such method can be used to fabricate gate valve structures and achieve the end product of a structurally sound gate valve body. This method of manufacture utilizes basic welding end assembly techniques and combines them in a novel sequence of steps for the making of a completely fabricated gate valve body structure. The specific gate valve body structure of this invention can be easily manufactured by following any of the method embodiments of this invention as set out herein. The novel seat support assembly structure including the groove therein can be constructed by conventional machining and assembly techniques and with conventional materials to achieve the end product.

In use of the method of manufacture of this invention it is seen that same provides a simple yet novel method of assembling or manufacturing a completely fabricated gate valve body structure. Additionally, it is seen that the novel welded structure and seat support assembly structure are particularly adapted for a welded figuration and they can be easily assembled by the method of manufacture described herein.

As will become apparent from the foregoing description of the applicants' gate valve body structure and the method of making same, a relatively inexpensive and simple method of manufacture has been provided to produce gate valve bodies. The body structure is economical to manufacture in that relatively small machines can be used to cut and shape critical portions of the structure. The method of manufacturing is economical in that it uses simple steps, pre-machined parts, and will utilize only a minimum of jig fixtures and other tooling to support the several parts as they are being assembled and joined together.

What is claimed is:

1. A fabricated gate valve structure, comprising:
  (a) a hollow valve body having a bonnet;
  (b) an inlet conduit and an outlet conduit mounted in opposed relation on said valve body and extending into a mid-portion thereof;
  (c) a seat support means mounted with said inlet conduit and said outlet conduit having a pair of adjacent and spaced apart support members, each seat support member having an annular seat pocket on the gate side thereof to receive and mount a gate valve seat therein;
  (d) said seat support members each having an annular groove in a spaced relation to an inner end portion of the associated seat pocket to define on one side of the groove an inner annular seat supporting lip which is capable of flexing and to define on the other side of the groove an outer conduit supporting cantilever beam which is capable of flexing and has an associated conduit welded thereto on the side thereof opposite the annular seat pocket whereby flexing of the outer cantilever beam may occur relative to the seat supporting lip to minimize any flexing of the seat supporting lip, said groove opening to the flow passageway of said gate valve structure and the associated seat supporting lip being behind the inner end of the associated valve seat to contact said valve seat inner end and support said valve seat; and (e) a gate mounted between the seat support members for movement between open and closed position.

2. The fabricated gate valve structure of claim 1, wherein:
   (a) said seat support assembly has a pair of integral conduit segments mounted on and extending outwardly from said seat support members; and
   (b) said conduit segments are mounted on said inlet conduit and said outlet conduit at an internally welded joint with said hollow valve body and form a continuation of the inlet and outlet conduits.

3. The fabricated gate valve structure of claim 1, wherein:
   (a) said hollow valve body is cylindrical; and
   (b) said groove has essentially the same depth as the radial depth dimension of said seat pocket.

4. A fabricated gate valve structure comprising:
   (a) a hollow cylindrical gate valve body having a bonnet thereon and a pair of transversely aligned opposed circular openings through the wall of the cylindrical body;
   (b) an inlet conduit and an outlet conduit mounted within the circular openings in axial alignment and forming a fluid passageway;
   (c) an exterior weld about each opening securing the associated conduit to the cylindrical body;
   (d) a gate and seat support assembly having a seat support member in fluid communication with the inner end of each of the inlet and outlet conduits, said seat support members being in a predetermined opposed spaced relation to each other;
   (e) each seat support member having an annular seat pocket opening on its inwardly facing surface, a gate valve seat mounted in the annular seat pocket, each seat support member having an annular groove opening to said fluid passageway and being substantially the radial depth of said seat pocket and located in a spaced relation to an inner end of said seat pocket, the annular groove defining on the side thereof adjacent the associated valve seat a seat supporting lip which is capable of flexing and defining on the other side of the groove an outer conduit supporting cantilever beam which is capable of flexing and has an associated conduit adjacent thereto;
   (f) an internal welded connection between said seat support members and said inlet and outlet conduits to join said seat support members to their respective conduits whereby flexing of the outer cantilever beams may occur relative to the seat supporting lips to minimize any flexing of the seat support lips; and
   (g) a gate mounted in the space between the opposed seat support members for movement between open and closed positions.

5. The fabricated gate valve structure of claim 4, wherein each seat support member has a pair of reinforcing ribs secured to opposing sides thereof extending in a direction transverse to the longitudinal axis of said fluid passageway.

* * * * *